(12) United States Patent
Hyugaji et al.

(10) Patent No.: US 9,331,593 B2
(45) Date of Patent: May 3, 2016

(54) SWITCHING POWER SUPPLY DEVICE

(71) Applicants: Takumi Hyugaji, Hachioji (JP); Naoto Endo, Tama (JP)

(72) Inventors: Takumi Hyugaji, Hachioji (JP); Naoto Endo, Tama (JP)

(73) Assignee: MITSUMI ELECTRIC CO., LTD., Tama-Shi, Tokyo (JP)

( * ) Notice: Subject to any disclaimer, the term of this patent is extended or adjusted under 35 U.S.C. 154(b) by 0 days.

(21) Appl. No.: 14/379,197

(22) PCT Filed: Feb. 6, 2013

(86) PCT No.: PCT/JP2013/052664
§ 371 (c)(1),
(2) Date: Aug. 15, 2014

(87) PCT Pub. No.: WO2013/121940
PCT Pub. Date: Aug. 22, 2013

(65) Prior Publication Data
US 2015/0023062 A1 Jan. 22, 2015

(30) Foreign Application Priority Data
Feb. 17, 2012 (JP) ................................. 2012-032447

(51) Int. Cl.
*H02M 3/335* (2006.01)
*H02M 1/00* (2006.01)
*H02M 7/48* (2007.01)

(52) U.S. Cl.
CPC ...... *H02M 3/33592* (2013.01); *H02M 3/33569* (2013.01); *H02M 3/33576* (2013.01);
(Continued)

(58) Field of Classification Search
CPC ................. H02M 2001/0025; H02M 3/33592; H02M 3/33576; H02M 2007/4815; H02M 2007/4818; Y02B 70/1475; Y02B 70/1491
See application file for complete search history.

(56) References Cited

U.S. PATENT DOCUMENTS 5,615,093 A * 3/1997 Nalbant .............. H02M 3/3376
315/307
7,633,780 B2 * 12/2009 Endo ..................... H02M 7/217
363/127

(Continued)

FOREIGN PATENT DOCUMENTS

JP 2009273329 A 11/2009
JP 2009278717 A 11/2009

(Continued)

OTHER PUBLICATIONS

International Preliminary Report on Patentability (IPRP) including Written Opinion dated Aug. 19, 2014, issued in parent International Application No. PCT/JP2013/052664.

(Continued)

*Primary Examiner* — Fred E Finch, III
*Assistant Examiner* — Rafael O De Leon Domenech
(74) *Attorney, Agent, or Firm* — Holtz, Holtz & Volek PC

(57) ABSTRACT

In a switching power supply device having low loss in synchronous rectifying switches, exhibiting high power efficiency, and not causing troubles by reverse current in the switches. A secondary control circuit includes a reference voltage circuit to generate a reference voltage having a predetermined potential, and an ON-timing detector circuit to detect an ON timing of a synchronous rectifying switch through monitoring of a terminal voltage of the switch, an OFF-timing detector circuit to detect an OFF timing of the switch, and a timer circuit to be turned on at the ON timing and measure a predetermined period. The threshold voltage consisting of the reference voltage generated by the reference voltage circuit and an offset voltage is applied to the OFF-timing detector circuit during the measurement of the timer circuit, and the threshold voltage consisting of the reference voltage is applied to the OFF-timing detector circuit during the non-measurement.

6 Claims, 6 Drawing Sheets

(52) U.S. Cl.
CPC ............... *H02M2001/0025* (2013.01); *H02M 2001/0054* (2013.01); *H02M 2007/4815* (2013.01); *H02M 2007/4818* (2013.01); *Y02B 70/1475* (2013.01); *Y02B 70/1491* (2013.01)

(56) References Cited

U.S. PATENT DOCUMENTS

| | | | |
|---|---|---|---|
| 8,085,558 B2* | 12/2011 | Choi | H02M 3/337 363/21.02 |
| 2006/0043955 A1* | 3/2006 | Hung | H02M 3/158 323/283 |
| 2009/0016083 A1* | 1/2009 | Soldano | H02M 3/33592 363/20 |
| 2009/0279326 A1 | 11/2009 | Hyuugaji | |
| 2009/0284989 A1 | 11/2009 | Sato | |
| 2010/0067262 A1 | 3/2010 | Chen et al. | |
| 2011/0085354 A1* | 4/2011 | Wang | H02M 1/4225 363/21.02 |
| 2011/0096578 A1 | 4/2011 | Fang et al. | |

FOREIGN PATENT DOCUMENTS

| | | |
|---|---|---|
| JP | 2010098935 A | 4/2010 |
| JP | 2010161917 A | 7/2010 |

OTHER PUBLICATIONS

International Search Report (ISR) dated Apr. 9, 2013 issued in International Application No. PCT/JP2013/052664.

* cited by examiner

SWITCHING POWER SUPPLY DEVICE

TECHNICAL FIELD

The present invention relates to a switching type power supply device including a transformer for power conversion, for example, an advantageous technique for a current-resonant switching power supply device including a series resonant circuit on the primary winding of a transformer and synchronous rectifying switches on the secondary winding of the transformer.

BACKGROUND ART

One of the conventional switching power supply devices is a current resonant converter including a series resonant circuit on the primary winding of a transformer. The current resonant converter includes the series resonant circuit including a resonant inductor and a resonant capacitor connected in series to a primary coil of the transformer, and a pair of switching elements to control current flowing from a DC-voltage input terminal to the series resonant circuit. The switching elements are alternately turned on or off at a frequency near the resonance frequency such that sinusoidal current flows in the primary coil of the transformer. The current induced in a secondary coil of the transformer is rectified with diodes and is smoothed with capacitors before output. The switching power supply device having such a configuration is known as a device exhibiting high power efficiency with low noise.

Unfortunately, such a current resonant converter including rectifying diodes in a secondary circuit may exhibit significantly decreased power efficiency due to large loss in the rectifying diodes. In order to reduce the loss in rectifying elements for improved power efficiency, for example, a device disclosed in Patent Literature 1 includes synchronous rectifying switching elements (MOSFETs) instead of the rectifying diodes in the secondary circuit and a secondary control circuit to detect terminal voltages of the secondary switching elements and turn on the secondary switching elements in synchronization with ON timings of the switching elements in the primary circuit.

PRIOR ART DOCUMENT

Patent Literature

Patent Literature 1: Japanese Unexamined Patent Application Publication No. 2010-161917

SUMMARY OF THE INVENTION

Problems to Be Solved by the Invention

In the current-resonant switching power supply device disclosed in Patent Literature 1, switching control signals on the primary winding are transmitted from the primary circuit to the secondary circuit, which is electrically insulated from the primary circuit, to prevent reverse current on the secondary winding. The transmission of the control signals requires installation of a transformer (pulse transformer) and a photocoupler. Unfortunately, this installation increases the number of components, which leads to increases in size and costs of the device.

The present inventors have studied a technique of monitoring source-drain voltages of synchronous rectifying MOSFETs (insulated-gate field effect transistors: hereinafter referred to as "MOS transistors") Qs1 and Qs2 to determine the timings for turning on and off the MOS transistors Qs1 and Qs2, as illustrated in FIG. 5. This configuration can eliminate the transmission of control signals from the primary circuit to the secondary circuit, to eliminate the use of a transformer (pulse transformer) and a photocoupler.

Each of the synchronous rectifying MOS transistors Qs1 and Qs2 should be turned on or off at a timing of reversal of the source-drain voltage of the transistor Qs1 or Qs2. In order to detect the timing, a comparator may be provided for comparing the source-drain voltage of the transistor Qs1 or Qs2 with a predetermined reference voltage (threshold voltage).

If a synchronous rectifying switch (Qs1 or Qs2) consists of a MOS transistor, the switch (Qs1 or Qs2) when turned on is equivalent to an LR series circuit, and the voltage across the terminals of the switch (Qs1 or Qs2) has a waveform depending on the current. Power supplies of different types provide various waveforms of the current, resulting in various waveforms of the voltage.

In the circuit illustrated in FIG. 5, a current ID having a waveform illustrated in FIG. 6(a) flows in the secondary synchronous rectifying MOS transistor Qs1 or Qs2 under light-load conditions. If the synchronous rectifying MOS transistor Qs1 or Qs2 was turned on all the time during the flow of the current ID, the source-drain voltage VDS of the transistor would have a waveform illustrated in FIG. 6(b). The comparator compares the source-drain voltage VDS with a predetermined OFF threshold voltage Vth_off that is determined to detect an optimal OFF timing under normal-load conditions, for turning off the transistor Qs1 or Qs2. This configuration has two OFF timings toff1 and toff2 under light-load conditions, as illustrated in FIG. 6.

In this case, the transistor Qs1 or Qs2 may be turned off at either of the two OFF timings. The inactivation at different timings leads to different voltage drops in the transistor Qs1 or Qs2, which causes fluctuations in output voltage VOUT. If the MOS transistor Qs1 or Qs2 is turned off at the time toff1, the remaining current (a portion shown by hatching) is rectified with a parasitic diode in the MOS transistor Qs1 or Qs2. This configuration increases the loss to decrease the power efficiency. FIG. 6(b) illustrates a waveform only during the flow of forward current (toward the coil in the drawing) in the synchronous rectifying MOS transistor. The illustration of a waveform during the other period than that of the flow of forward current is omitted to simplify the explanation. During the other period, in fact, reverse voltage occurs between the source and the drain of the synchronous rectifying MOS transistor Qs1 or Qs2, due to the switching of the ON/OFF states of main switching elements S1 and S2 to reverse the polarity of a transformer 10.

In order to avoid inactivation of the synchronous rectifying MOS transistor (synchronous rectifying switch) Qs1 or Qs2 at the time toff1 in FIG. 6, the secondary circuit in the power supply device in FIG. 5 may further include a timer in each control circuit for turning on the synchronous rectifying switch. With reference to FIG. 6(d), the timer is turned on at a time t0, and OFF signals are masked during the operation of the timer. This technique can cancel the OFF signals at the time toff1 (ensure the minimum ON period Ton_min).

Unfortunately, this technique is problematic if reverse current flows in the synchronous rectifying switch (Qs1 or Qs2), as illustrated in FIG. 7(a), due to a sudden stop of the primary switching elements or a sudden drop in load.

In specific, if reverse current flows as illustrated in FIG. 7(a), the source-drain voltage VDS of the switch Qs1 or Qs2 varies as illustrated in FIG. 7(b), while gate-off signals VG_OFF vary to turn off the switch Qs1 or Qs2 at a time t1 as illustrated in FIG. 7(c). If the gate-off signals are masked by the output (d) from the timer, the synchronous rectifying switch (Qs1 or Qs2), which should be turned off at the time t1, remains active until a time t2 after the elapse of the minimum ON period Ton_min as illustrated in FIG. 7(e). The synchronous rectifying switch cannot be turned off until the reverse current significantly increases, which may damage the synchronous rectifying switch and the control circuit.

An object of the invention, which has been accomplished on the above background, is to provide a switching type power supply device including a power converting transformer that has low loss in secondary synchronous rectifying switches and exhibits high power efficiency, while not causing increase in size of the device and increases in costs, and further not causing troubles by the reverse current in the synchronous rectifying switches.

Means for Solving the Problems

In order to achieve the above object, a switching power supply device according to the invention includes: a transformer for power conversion; a main switching element connected in series to a primary coil of the transformer; a primary control circuit to turn on or off the main switching element; asynchronous rectifying switching element connected in series to a secondary coil of the transformer; and a secondary control circuit to turn on or off the synchronous rectifying switching element. The secondary control circuit includes an ON-timing detector circuit to detect an ON timing of the synchronous rectifying switching element through monitoring of a terminal voltage of the synchronous rectifying switching element, and an OFF-timing detector circuit to detect an OFF timing of the synchronous rectifying switching element through comparison of the terminal voltage of the synchronous rectifying switching element with a threshold voltage. A voltage obtained by adding a predetermined offset voltage to a reference voltage is applied as the threshold voltage to the OFF-timing detector circuit, before elapse of a predetermined period since activation of the synchronous rectifying switching element. The reference voltage is applied as the threshold voltage to the OFF-timing detector circuit, after the elapse of the predetermined period and before subsequent activation of the synchronous rectifying switching element.

Even if the terminal voltage of the synchronous rectifying switching element exceeds the threshold voltage for detection of an OFF timing immediately after the activation of the synchronous rectifying switching element, the voltage obtained by adding the offset voltage to the reference voltage is applied as the threshold voltage to the OFF-timing detector circuit. This configuration can avoid the inactivation of the synchronous rectifying switching element immediately after the activation, thereby preventing fluctuations in output voltage.

This configuration can also prevent current from flowing through a parasitic diode due to the inactivation of the synchronous rectifying switching element immediately after the activation, thereby avoiding loss. The power efficiency can therefore be improved.

Even if the threshold voltage is changed to the voltage obtained by adding the offset voltage to the reference voltage during the predetermined period after the activation of the synchronous rectifying MOS transistor, relatively high reverse current flowing in the synchronous rectifying MOS transistor can cause the terminal voltage of the synchronous rectifying MOS transistor to exceed the threshold voltage. This configuration can detect the reverse current to turn off the synchronous rectifying MOS transistor.

It is preferred that the secondary control circuit further include a timer circuit to be turned on in response to the activation of the synchronous rectifying switching element and to measure the predetermined period; a voltage obtained by adding a predetermined offset voltage to the reference voltage be applied as the threshold voltage to the OFF-timing detector circuit during the measurement of the timer circuit; and the reference voltage be applied as the threshold voltage to the OFF-timing detector circuit during the non-measurement of the timer circuit.

The timer circuit is provided to determine the period of application, as the threshold voltage, of the voltage obtained by adding the predetermined offset voltage to the reference voltage to the OFF-timing detector circuit. This configuration can facilitate determination of the period of application, as the threshold voltage, of the voltage obtained by adding the offset voltage to the reference voltage.

It is further preferred that the secondary control circuit further include a switching frequency detector circuit to detect a switching frequency through monitoring of the terminal voltage of the synchronous rectifying switching element; and the timer circuit measure the length of the predetermined period depending on the switching frequency detected by the switching frequency detector circuit, such that as the switching frequency increases, the period becomes shorter, while as the switching frequency decreases, the period becomes longer.

The period of the measurement of the timer circuit, i.e., the shifting period of application, as the threshold voltage, of the voltage obtained by adding the offset voltage to the reference voltage is variable depending on the frequency detected by the switching frequency detector circuit. This configuration can optimize the period of shifting the threshold voltage, thereby avoiding malfunctions caused by variations in the switching frequency.

It is preferred that the secondary control circuit further include a load determining circuit to determine load conditions; and the reference voltage be applied as the threshold voltage to the OFF-timing detector circuit regardless of an operating state of the timer circuit, as long as the load determining circuit determines no-load conditions.

The threshold voltage is not shifted under no-load conditions, so that the synchronous rectifying switching element can be turned off at an early timing under no-load conditions. This configuration can prevent reverse current from flowing in the switching element, thereby avoiding a decrease in the power efficiency.

It is further preferred that the switching power supply device include, on a primary winding of the transformer, a series resonant circuit including a resonant inductor and a resonant capacitor connected in series to the primary coil of the transformer, a pair of main switching elements to control current flowing from a DC-voltage input terminal to the series resonant circuit, and the primary control circuit to alternately turn on or off the main switching elements; the switching power supply device include, on a secondary winding of the transformer, the synchronous rectifying switching element, the secondary control circuit, and an output voltage detector to detect an output voltage and generate feedback signals depending on the output voltage; and the feedback signals be transmitted to the primary control circuit and the primary control circuit vary the switching frequency depending on the feedback signals.

The current-resonant switching power supply device having such configurations can prevent the terminal voltage of the synchronous rectifying switching element from reaching the threshold voltage for inactivation of the switching element immediately after the activation of the switching element under light-load conditions, thereby preventing fluctuations in output voltage.

Advantageous Effects of the Invention

The invention can provide a switching type power supply device including a power converting transformer that has low loss in secondary synchronous rectifying switches and exhibits high power efficiency, while maintaining the compact size of the device without increases in costs and not causing troubles by the reverse current in the synchronous rectifying switches.

BEST MODE FOR CARRYING OUT THE INVENTION

A preferred embodiment of the invention will now be described with reference to the drawings.

Figure 1:
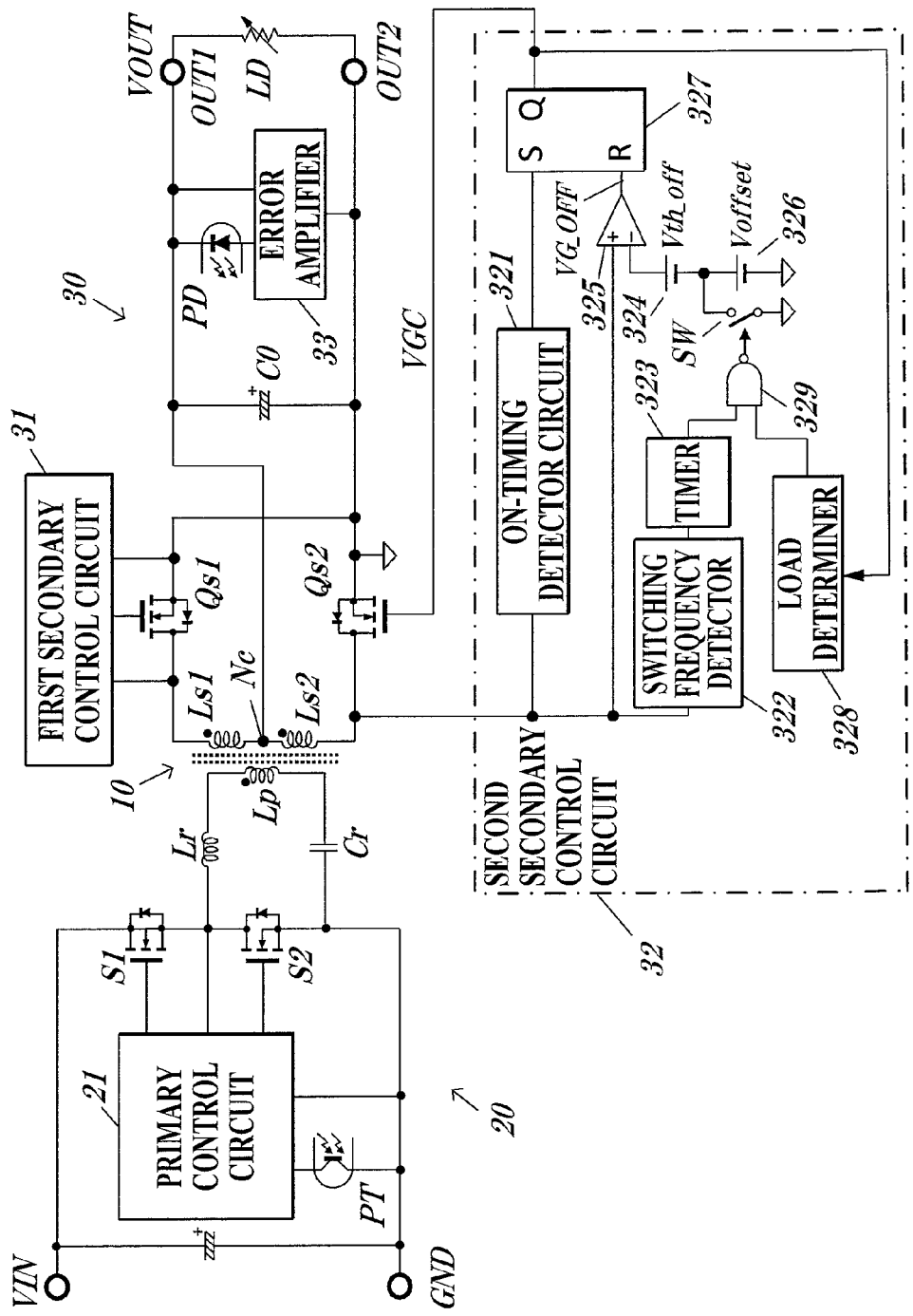
FIG. 1 illustrates the circuit configuration of the current-resonant switching power supply device according to an embodiment of the invention.

FIG. 1 illustrates a current-resonant switching power supply device according to an embodiment of the invention.

The current-resonant switching power supply device according to the embodiment includes a power converting transformer 10, a half-bridge series resonant circuit 20 on the primary winding of the transformer 10, and a full-wave rectifier circuit 30 including synchronous rectifying switches on the secondary winding of the transformer 10.

The primary series resonant circuit 20 includes a resonant inductor Lr and a resonant capacitor Cr connected in series to a primary coil Lp of the transformer 10. The series resonant circuit 20 further includes main switching elements S1 and S2 consisting of n-channel MOS transistors that are connected in series between a voltage input terminal VIN and a terminal GND. A DC voltage from a DC voltage source (including a diode bridge circuit converting AC voltage into DC voltage; not shown) is applied to the voltage input terminal VIN, while a reference potential such as ground potential is applied to the terminal GND. The series resonant circuit 20 further includes a primary control circuit 21 to turn on or off the main switching elements S1 and S2. The primary control circuit 21 alternately turns on or off the main switching elements S1 and S2 at a frequency near the resonance frequency such that sinusoidal current flows in the primary coil Lp of the transformer 10.

The series resonant circuit 20 according to the embodiment further includes a light-receiving phototransistor PT to receive feedback signals from a secondary circuit (error amplifier 33). The primary control circuit 21 varies the switching frequency of the main switching elements S1 and S2 depending on the feedback signals, to respond to variations in load.

The secondary full-wave rectifier circuit 30 includes a synchronous rectifying MOS transistor Qs1 connected between a first secondary coil Ls1 of the transformer 10 and an output terminal OUT2, a synchronous rectifying MOS transistor Qs2 connected between a second secondary coil Ls2 of the transformer 10 and the output terminal OUT2, a first secondary control circuit 31 to detect a source-drain voltage of the MOS transistor Qs1 and generate ON or OFF control signals for the MOS transistor Qs1, and a second secondary control circuit 32 to detect a drain voltage (source-drain voltage) of the MOS transistor Qs2 and generate ON or OFF control signals for the MOS transistor Qs2.

The first secondary control circuit 31 and the second secondary control circuit 32 complementarily turn on or off the synchronous rectifying MOS transistors Qs1 and Qs2, respectively. In other words, the first secondary control circuit 31 turns on the synchronous rectifying MOS transistor Qs1 in the first or second half of each cycle of switching control in the primary control circuit 21; while the second secondary control circuit 32 turns on the synchronous rectifying MOS transistor Qs2 in the second or first half.

The secondary full-wave rectifier circuit 30 further includes a smoothing capacitor C0 connected between output terminals OUT1 and OUT2 to stabilize the output voltage VOUT, and an error amplifier 33 to detect the output voltage VOUT and supply a current in response to the potential of the output voltage VOUT to a photodiode PD for feedback control. The output terminal OUT1 is connected to the midpoint between the secondary coils (a node Nc connecting the first coil Ls1 and the second coil Ls2) of the transformer 10.

The second secondary control circuit 32 will now be described in detail. The first secondary control circuit 31 has the same configuration and performs the same operation as the second secondary control circuit 32 (at a timing shifted by a half cycle); hence, the illustration and description of the first secondary control circuit 31 are omitted.

With reference to FIG. 1, the second secondary control circuit 32 according to the embodiment includes an ON-timing detector circuit 321 including a comparator to detect an ON timing of the synchronous rectifying MOS transistor Qs2 through monitoring of a drain voltage of the MOS transistor Qs2, a switching frequency detector circuit 322 to detect a switching frequency through monitoring of the drain voltage of the MOS transistor Qs2, and a timer circuit 323 to be turned on at the ON timing of the MOS transistor Qs2 and to measure a predetermined period.

The timer circuit 323 varies the predetermined period depending on the detected switching frequency through reception of signals transmitted from the switching frequency detector circuit 322. In specific, as the switching frequency decreases (i.e., the cycle of the frequency becomes longer), the period to be measured becomes longer, while as the switching frequency increases, the period becomes shorter. The timer circuit 323 may be an analog circuit or a digital circuit. The switching frequency detector circuit 322 monitors the drain voltage of the synchronous rectifying MOS transistor Qs2, and thus can detect the timing of activation of the MOS transistor Qs2 as well as the switching frequency.

The second secondary control circuit 32 further includes a reference voltage source 324 to generate a reference voltage Vth_off, a comparator 325 to detect an OFF timing of the synchronous rectifying MOS transistor Qs2 (gate-off signals VG_OFF) through comparison of the drain voltage of the MOS transistor Qs2 with the reference voltage Vth_off, and an offset voltage source 326 to generate an offset voltage Voffset to be added to the reference voltage Vth_off.

The second secondary control circuit 32 further includes a switch SW connected in parallel with the offset voltage source 326, an RS flip-flop 327 including a reset terminal to receive an output from the comparator 325 and a set terminal to receive an output from the ON-timing detector circuit 321, a load determining circuit 328 to determine conditions of a load LD, for example, through monitoring of gate control signals VGC for the MOS transistor Qs2, and a NAND gate 329 to receive outputs from the timer circuit 323 and the load determining circuit 328. The switch SW is turned on or off in response to an output from the NAND gate 329. If the switch SW is turned off, a voltage obtained by adding the offset voltage Voff set to the reference voltage Vth_off is applied as a threshold voltage to the comparator 325.

The switch SW is turned on in response to a high output from the NAND gate 329, and is turned off in response to a low output.

Figure 2:
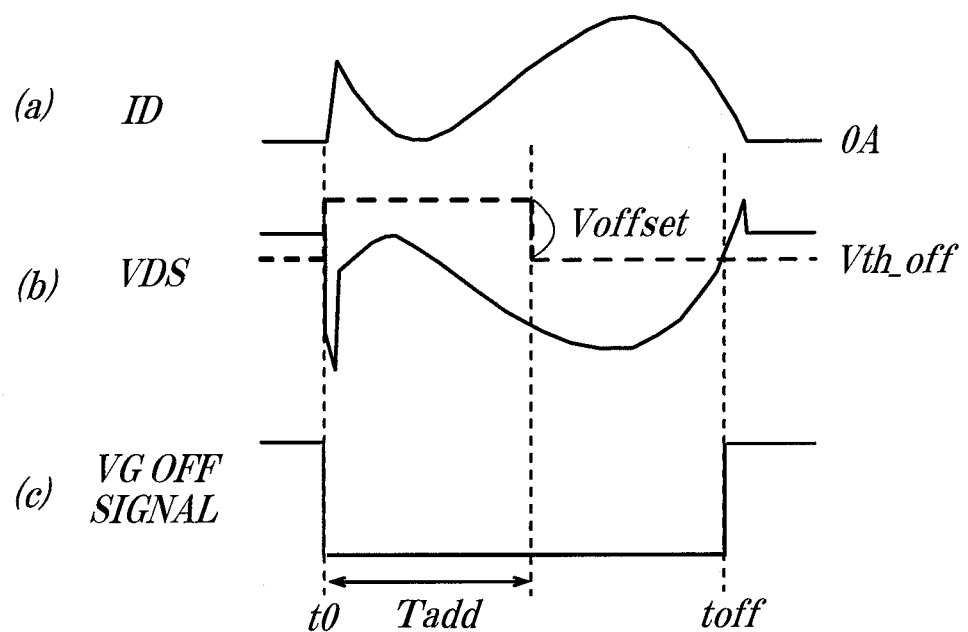
FIG. 2 is a waveform diagram illustrating variations in drain current and source-drain voltage of a secondary synchronous rectifying switching element (MOS transistor), and gate-off signals for the switching element, in a normal operation mode in a current-resonant switching power supply device according to the embodiment.

The value of the offset voltage Voff set is set higher than that of the maximum source-drain voltage VDS within a period Tadd illustrated in FIG. 2. The value of the offset voltage Voff set is determined depending on the product of the on-resistance value of the synchronous rectifying MOS transistor Qs2 and the magnitude of the current (maximum current) flowing in the MOS transistor Qs2, and the product of the parasitic inductance of the MOS transistor Qs2 and the gradient of the current flowing in the MOS transistor Qs2. The current flowing in the MOS transistor Qs2 varies depending on a type or configuration of the power supply device, and therefore cannot be generalized by a predetermined value. The current flowing in the MOS transistor Qs2 also depends on the voltage value of the output voltage VOUT, the inductance of the secondary coil of the transformer 10, and the switching frequency on the primary winding. That is, in a certain configuration of the power supply device, the value of the offset voltage Voff set can be determined based on the parameters consisting of the on-resistance value of the synchronous rectifying MOS transistor Qs2, the voltage value of the output voltage VOUT, the inductance of the secondary coil of the transformer 10, and the switching frequency on the primary winding.

The load determining circuit 328 determines no-load conditions. Upon determination of no-load conditions, an output from the load determining circuit 328 is changed, for example, into a low level to maintain the switch SW to be active regardless of the high output from the timer circuit 323. This control prevents the offset voltage Voff set from being added to the reference voltage Vth_off.

As the load decreases, the OFF timing of the synchronous rectifying MOS transistor Qs2 is advanced. The load determining circuit 328 monitors the OFF timing of gate control signals VGC for the MOS transistor Qs2 to determine load conditions according to the embodiment; alternatively, the load determining circuit 328 may monitor the output from the comparator 325. In an alternative embodiment, a current sensing resistor for detecting current flowing in the load may be provided and monitoring of the signals to determine no-load conditions may be replaced with monitoring of a voltage drop in the current sensing resistor.

Figure 3:
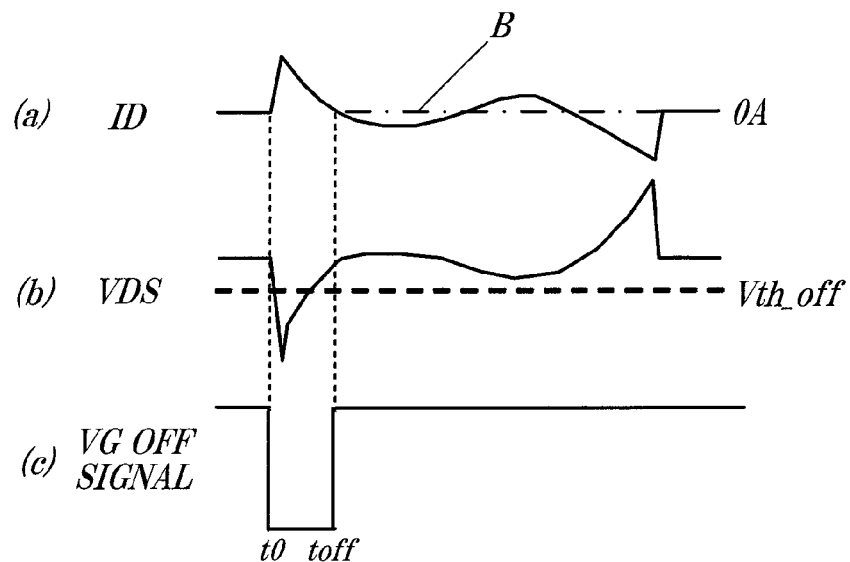
FIG. 3 is a waveform diagram illustrating variations in drain current and source-drain voltage of a secondary synchronous rectifying switching element (MOS transistor), and gate-off signals for the switching element, under no-load conditions in a current-resonant switching power supply device according to the embodiment.

An operation of the second secondary control circuit 32 will now be explained with reference to the waveform diagrams of FIGS. 2 and 3. FIG. 2 illustrates variations in a drain current ID and a source-drain voltage VDS of the secondary synchronous rectifying MOS transistor Qs2, and gate-off signals VG_OFF for the MOS transistor Qs2 (an output from the comparator 325) "in a normal operation mode (under light-load conditions)." FIG. 3 illustrates variations in the drain current ID and the source-drain voltage VDS of the secondary synchronous rectifying MOS transistor Qs2, and gate-off signals VG_OFF for the MOS transistor Qs2 "under no-load conditions." FIGS. 2(a) and 3(a) each illustrate variations in the drain current ID of the synchronous rectifying MOS transistor Qs2, assuming that the MOS transistor Qs2 is continuously remained active. The load determining circuit 328 provides a high output "in a normal operation mode," and a low output "under no-load conditions."

With reference to FIG. 2, in a normal operation mode in the second secondary control circuit 32 according to the embodiment, the timer circuit 323 is turned on at a time t0 when the source-drain voltage VDS of the MOS transistor Qs2 falls in response to the reversal of the voltage applied to the primary coil of the transformer 10 (while the load determining circuit 328 provides a high output). The output from the timer circuit 323 varies from a low level to a high level, so that the switch SW is turned off. As illustrated with a broken line in FIG. 2(b), the threshold voltage to be applied to the comparator 325 is changed to the voltage (Vth_off+Voffset) obtained by adding the offset voltage Voffset to the reference voltage Vth_off.

Upon the elapse of the period Tadd measured by the timer circuit 323, the output from the timer circuit 323 varies from a high level to a low level, so that the switch SW is turned on. The threshold voltage to be applied to the comparator 325 is changed to the reference voltage Vth_off.

As illustrated with a solid line in FIG. 2(b), even if the source-drain voltage VDS of the MOS transistor Qs2 increases to exceed the reference voltage Vth_off during the period Tadd, the source-drain voltage VDS does not exceed the voltage (Vth_off+Voffset) obtained by adding the offset voltage Voff set to the reference voltage Vth_off. The output from the comparator 325, i.e., the gate-off signals VG_OFF for the MOS transistor Qs2 remain at a low level from the time t0 until a time toff, as illustrated in FIG. 2(c). The output from the flip-flop 327, i.e., the gate control signals VGC for the MOS transistor Qs2 therefore remain unchanged. This control can prevent the inactivation of the synchronous rectifying MOS transistor Qs2 shortly after the activation in response to a variation in the source-drain voltage VDS during the period Tadd, thereby preventing loss and fluctuations in output voltage VOUT.

Upon the elapse of the period Tadd measured by the timer circuit 323, the threshold voltage applied to the comparator 325 is changed to the reference voltage Vth_off. This control can vary the gate-off signals VG_OFF for the synchronous rectifying MOS transistor Qs2 into a high level to turn off the MOS transistor Qs2 at the time toff when the MOS transistor Qs2 should be turned off.

According to the embodiment, the period Tadd measured by the timer circuit 323 varies depending on the switching frequency. This configuration can prevent the OFF timing toff from occurring in the period Tadd due to a short cycle of the waveform of the source-drain voltage VDS (FIG. 2(b)) at a high switching frequency, to avoid the occurrence of the state that the MOS transistor Qs2 cannot be turned off at a desired timing.

According to the embodiment, under no-load conditions, the load determining circuit 328 determines no-load conditions and provides a lowered output to maintain the high output from the NAND gate 329, so that the switch SW remains active. As a result, the threshold voltage to be applied to the comparator 325 remains to be the reference voltage Vth_off, as illustrated with a broken line in FIG. 3(b).

Even if the threshold voltage is temporarily changed with the timer circuit 323 as in the embodiment, the synchronous rectifying MOS transistor Qs2 can be turned off at the early time toff under no-load conditions, as illustrated in FIG. 3(c). This configuration can prevent reverse current in the MOS transistor Qs2, thereby avoiding a decrease in the power efficiency. FIG. 3(a) illustrates reverse current in the MOS transistor Qs2 for illustration purposes. In fact, the reverse current does not flow in the MOS transistor Qs2 because the MOS transistor Qs2 is turned off at the time toff, and the drain current ID after the time toff has a waveform as illustrated with a one-dot chain line B in FIG. 3(a).

Figure 7:
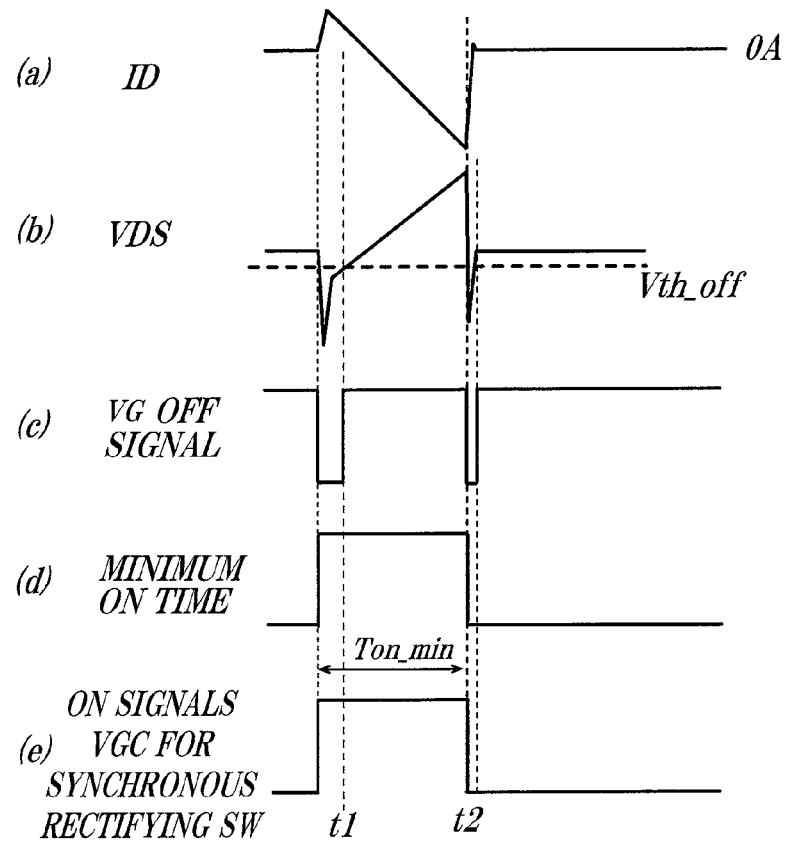
FIG. 7 is a waveform diagram illustrating variations in drain current and source-drain voltage of a secondary synchronous rectifying switching element (MOS transistor), gate-off signals for the switching element, signals output from a timer, and gate-on signals for the switching element, during flow of reverse current in a conventional current-resonant switching power supply device.

The threshold voltage is shifted to the voltage (Vth_off+ Voffset) consisting of the voltages Vth_off and Voffset during the predetermined period Tadd after the activation of the synchronous rectifying MOS transistor Qs2 according to the embodiment. Even in this configuration, if the drain current ID of the MOS transistor Qs2 is reversed as illustrated in FIG. 7, the drain voltage VDS of the MOS transistor Qs2 exceeds the voltage (Vth_off+Voffset). The configuration can detect the reverse current to turn off the MOS transistor Qs2.

Although the invention accomplished by the inventors is specifically described above on the basis of an embodiment, the invention should not be limited to the embodiment. For example, although the secondary circuit in the embodiment consists of a full-wave rectifier circuit, the secondary circuit may consist of a half-wave rectifier circuit (free from the MOS transistor Qs1 and the control circuit 31).

Although the load determining circuit 328 is provided to avoid changing of the threshold voltage under no-load conditions in the embodiment, the load determining circuit 328 is not an essential component. The load determining circuit 328 and the NAND gate 329 may be omitted. According to the embodiment, the switch SW for changing the threshold voltage is controlled by the NAND gate 329 for taking a logical product of the output from the load determining circuit 328 and the output from the timer circuit 323. Alternatively, the output from the load determining circuit 328 may inactivate the timer circuit 323, while the load determining circuit 328 is determining no-load conditions.

According to the embodiment, the threshold voltage to be applied to the comparator 325 consists of the reference voltage Vth_off alone or the sum of the reference and offset voltages Vth_off and Voffset. Alternatively, a divided component of the reference voltage, which is obtained by dividing the reference voltage with a voltage-dividing circuit including multiple resistors connected in series, may be applied as the threshold voltage, and the ratio of voltage division is varied depending on the output from the timer circuit 323, such that the voltage corresponding to the voltage Vth_off or (Vth_off+Voffset) may be applied to the comparator 325.

Alternatively, a first reference voltage source for generating the voltage Vth_off, a second reference voltage source for generating a voltage corresponding to the voltage (Vth_off+ Voffset), and a selector may be provided, such that the selector selects either one of the voltage sources depending on the output from the timer circuit 323 to apply a voltage to the comparator 325.

Figure 8:
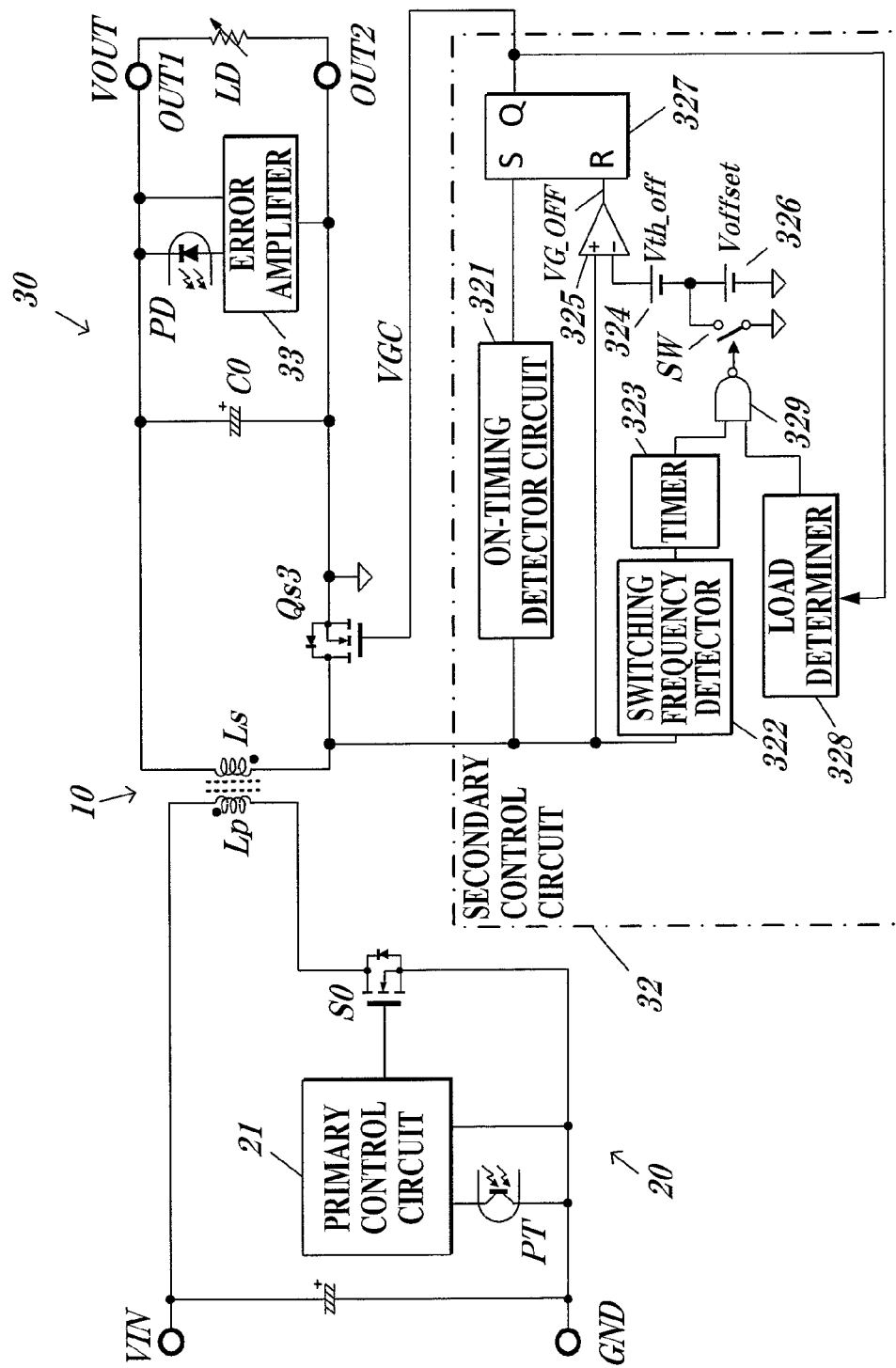
FIG. 8 illustrates a circuit configuration of a flyback switching power supply device according to an embodiment of the invention.

Although the invention is applied to the current-resonant switching power supply device including the primary series resonant circuit in the embodiment, the invention should not be limited to the embodiment. The invention may be applied to a flyback switching power supply device as illustrated in FIG. 8; the device including a primary switching element S0 connected in series to a primary coil, a control circuit 21 to turn on or off the switching element S0, and a circuit to rectify an AC current induced in a secondary coil by an intermittent current flowing in the primary coil. The secondary control circuit 32, which is identical to that of the embodiment in FIG. 1, is referred to by the same reference signs without redundant description.

Figure 4:
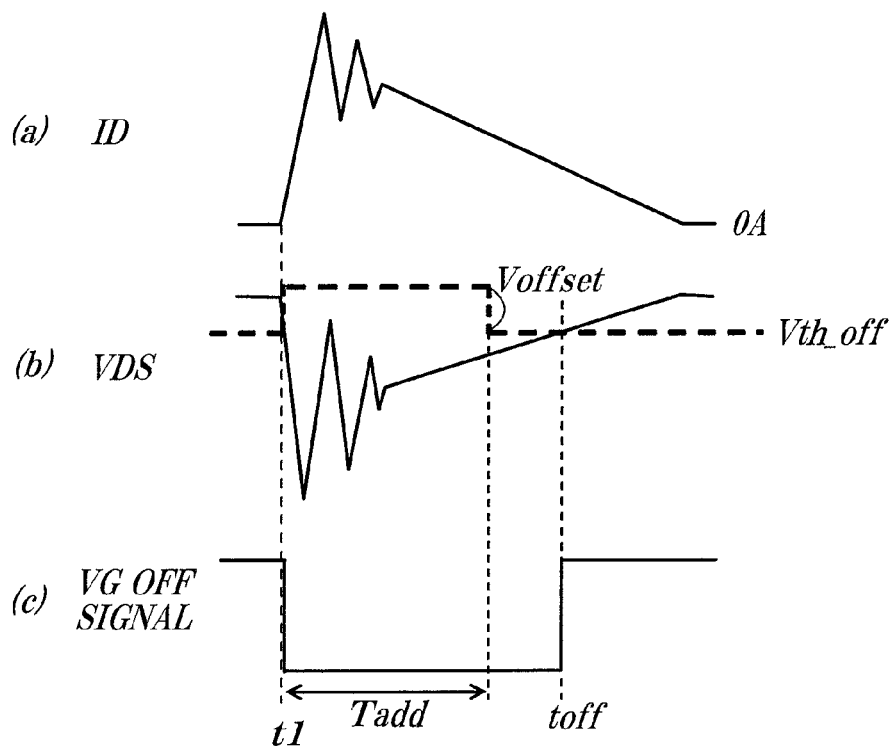
FIG. 4 is a waveform diagram illustrating variations in drain current and source-drain voltage of a secondary synchronous rectifying switching element (MOS transistor), and gate-off signals for the switching element, in an advantageous flyback switching power supply device according to the invention.
Figure 5:
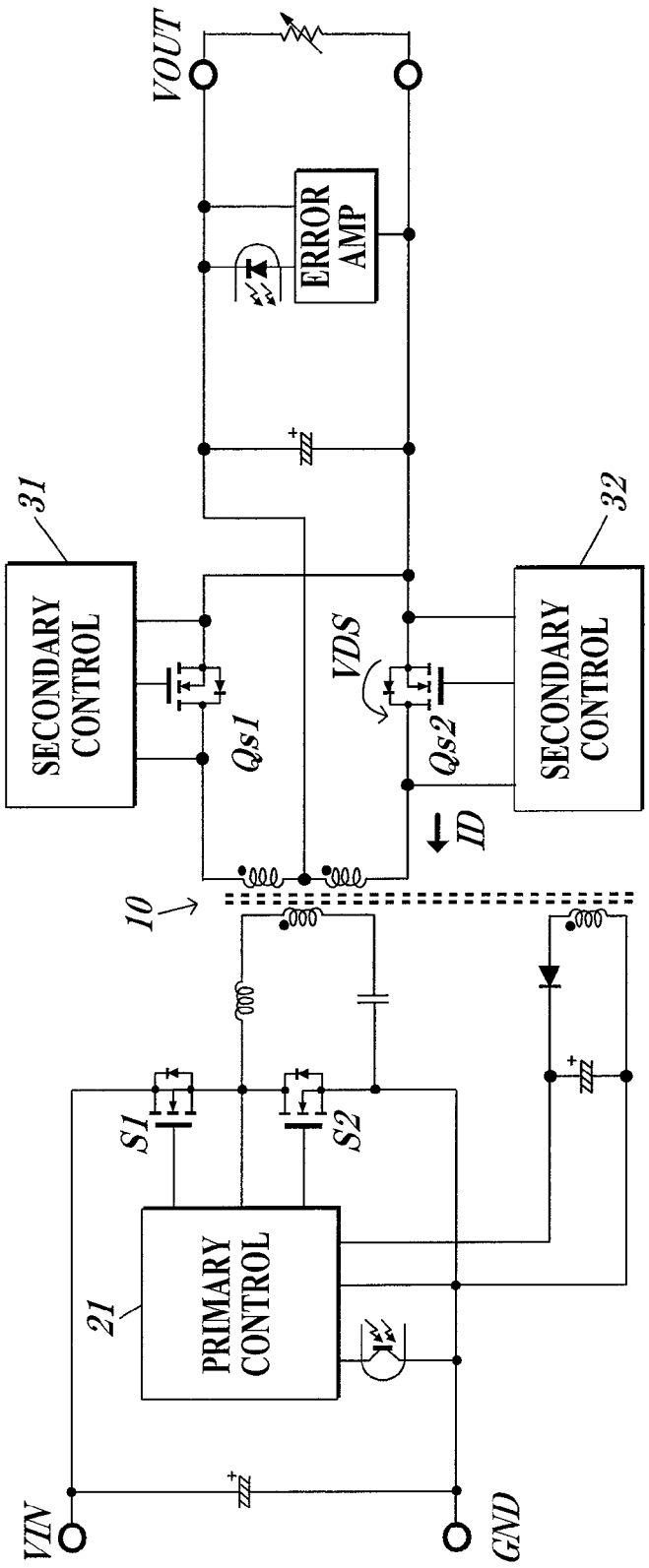
FIG. 5 illustrates an example circuit configuration of a conventional current-resonant switching power supply device.
Figure 6:
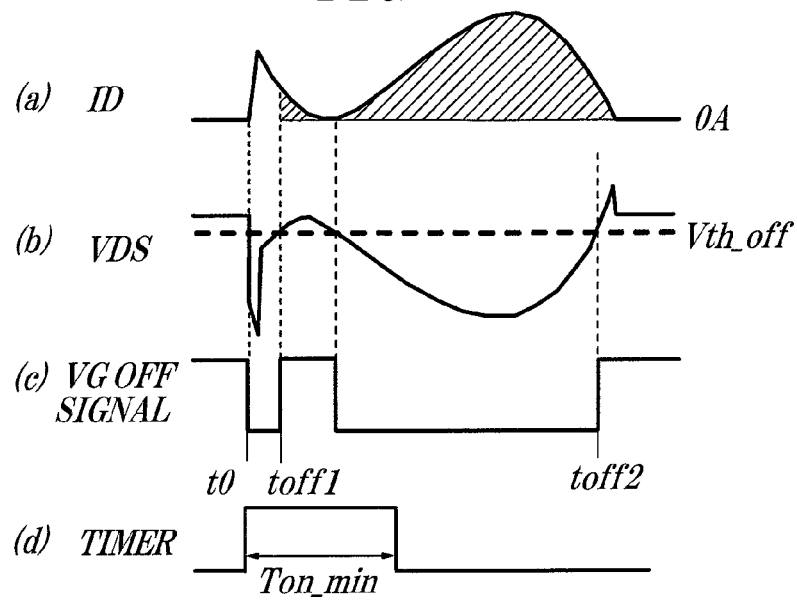
FIG. 6 is a waveform diagram illustrating variations in drain current and source-drain voltage of a secondary synchronous rectifying switching element (MOS transistor), and gate-off signals for the switching element, in a normal operation mode in a conventional current-resonant switching power supply device.

Advantages of the flyback switching power supply device according to the invention will now be described with reference to FIGS. 4 and 8. FIG. 4 illustrates variations in the current ID and the source-drain voltage VDS of the secondary switching element, and gate-off signals VG_OFF for the switching element.

With reference to FIGS. 4(a) and (b), the drain current ID and the source-drain voltage VDS in the flyback switching power supply device exhibit ringing immediately after a time t1 for activation of a synchronous rectifying MOS transistor Qs3. If a constant threshold voltage is applied, the ringing in the source-drain voltage VDS may cause false detection of the comparator 325 for OFF-timing detection. The false detection of the comparator for OFF-timing detection reduces the ON period of the synchronous rectifying MOS transistor Qs3. The current thus flows through a parasitic diode in the MOS transistor Qs3 for a longer period, causing loss. The invention can avoid the false detection of the comparator 325 for OFF-timing detection caused by the ringing in the source-drain voltage VDS. In specific, a circuit to add an offset voltage Voffset to a reference voltage Vth_off is provided, and the threshold voltage is changed from the voltage Vth_off to the voltage (Vth_off+Voffset) for a predetermined period Tadd after the time t1 as illustrated with a broken line in FIG. 4(b). This configuration can reduce the period of flow of current through the parasitic diode in the MOS transistor Qs3, thereby avoiding loss.

INDUSTRIAL APPLICABILITY

Although the invention is applied to the current-resonant switching power supply device including the series resonant circuit on the primary winding of the transformer and the synchronous rectifying switches on the secondary winding of the transformer in the embodiment, the invention should not be limited to the embodiment. The invention can also be applied to a wide variety of switching type power supply device including power converting transformers.

EXPLANATION OF REFERENCE NUMERALS 10 transformer
20 series resonant circuit (primary circuit)
30 full-wave rectifier circuit (secondary circuit)
31 first secondary control circuit
32 second secondary control circuit
321 ON-timing detector circuit
322 switching frequency detector circuit
323 timer circuit
324 reference voltage source
325 comparator (OFF-timing detector circuit)
326 offset voltage source
328 load determining circuit
Qs1, Qs2 synchronous rectifying switching element (MOS transistor)

The invention claimed is:

1. A switching power supply device comprising: a transformer for power conversion; at least one main switching element connected in series to a primary coil of the transformer; a primary control circuit to turn on or off the main switching element; a synchronous rectifying switching element connected in series to a secondary coil of the transformer; and a secondary control circuit to turn on or off the synchronous rectifying switching element, wherein: the secondary control circuit comprises: an ON-timing detector circuit to detect an ON timing of the synchronous rectifying switching element through monitoring of a terminal voltage of the synchronous rectifying switching element, and an OFF-timing detector circuit to detect an OFF timing of the synchronous rectifying switching element through comparison of the terminal voltage of the synchronous rectifying switching element with a threshold voltage, a voltage obtained by adding a predetermined offset voltage to a reference voltage is applied as the threshold voltage to the OFF-timing detector circuit, before elapse of a predetermined period since activation of the synchronous rectifying switching element, the reference voltage is applied as the threshold voltage to the OFF-timing detector circuit, after the elapse of the predetermined period and before subsequent activation of the synchronous rectifying switching element, and the reference voltage and the offset voltage are set such that the terminal voltage of the synchronous rectifying switching element when a current therethrough flows in a forward direction is lower than the voltage obtained by adding the offset voltage to the reference voltage.

2. The switching power supply device according to claim 1, wherein:
the secondary control circuit further comprises a timer circuit to be turned on in response to the activation of the synchronous rectifying switching element and to measure the predetermined period,
a voltage obtained by adding a predetermined offset voltage to the reference voltage is applied as the threshold voltage to the OFF-timing detector circuit during the measurement of the timer circuit, and
the reference voltage is applied as the threshold voltage to the OFF-timing detector circuit during the non-measurement of the timer circuit.

3. The switching power supply device according to claim 2, wherein:
the secondary control circuit further comprises a switching frequency detector circuit to detect a switching frequency through monitoring of the terminal voltage of the synchronous rectifying switching element, and
the timer circuit measures a length of the predetermined period depending on the switching frequency detected by the switching frequency detector circuit, such that as the switching frequency increases, the period becomes shorter, while as the switching frequency decreases, the period becomes longer.

4. The switching power supply device according to claim 2, wherein:
the secondary control circuit further comprises a load determining circuit to determine load conditions, and
the reference voltage is applied as the threshold voltage to the OFF-timing detector circuit regardless of an operating state of the timer circuit, as long as the load determining circuit determines no-load conditions.

5. The switching power supply device according to claim 3, wherein:
the secondary control circuit further comprises a load determining circuit to determine load conditions, and
the reference voltage is applied as the threshold voltage to the OFF-timing detector circuit regardless of an operating state of the timer circuit, as long as the load determining circuit determines no-load conditions.

6. The switching power supply device according to claim 1, further comprising: on a primary winding of the transformer: a series resonant circuit comprising a resonant inductor and a resonant capacitor connected in series to the primary coil of the transformer, the at least one main switching element comprises a pair of main switching elements to control current flowing from a DC-voltage input terminal to the series resonant circuit, and the primary control circuit to alternately turn on or off the main switching elements, and on a secondary winding of the transformer: the synchronous rectifying switching element, the secondary control circuit, and an output voltage detector to detect an output voltage and generate feedback signals depending on the output voltage, wherein the feedback signals are transmitted to the primary control circuit and the primary control circuit varies the switching frequency depending on the feedback signals.

* * * * *